(12) United States Patent
Baker et al.

(10) Patent No.: US 10,387,707 B2
(45) Date of Patent: Aug. 20, 2019

(54) REINFORCEMENT PANEL FOR FINGERPRINT SENSOR COVER

(71) Applicant: IDEX ASA, Fornebu (NO)

(72) Inventors: David Rodney Baker, Tewksbury, MA (US); David N. Light, Los Gatos, CA (US)

(73) Assignee: IDEX ASA, Fornebu (NO)

( * ) Notice: Subject to any disclaimer, the term of this patent is extended or adjusted under 35 U.S.C. 154(b) by 32 days.

(21) Appl. No.: 15/628,003

(22) Filed: Jun. 20, 2017

(65) Prior Publication Data
US 2017/0372112 A1    Dec. 28, 2017

Related U.S. Application Data

(60) Provisional application No. 62/354,210, filed on Jun. 24, 2016.

(51) Int. Cl.
| | | |
|---|---|---|
| *G06K 9/20* | (2006.01) | |
| *G06K 9/00* | (2006.01) | |
| *G06F 3/041* | (2006.01) | |

(52) U.S. Cl.
CPC ......... *G06K 9/0002* (2013.01); *G06K 9/0008* (2013.01); *G06K 9/00053* (2013.01); *G06F 3/041* (2013.01); *G06K 9/00087* (2013.01)

(58) Field of Classification Search
CPC ............ G06K 9/0002; G06K 9/00006–9/0012
See application file for complete search history.

(56) References Cited

U.S. PATENT DOCUMENTS

| | | |
|---|---|---|
| 4,290,052 A | 9/1981 | Eichelberger et al. |
| 8,736,001 B2 | 5/2014 | Salatino et al. |
| 9,268,989 B2 | 2/2016 | Pope et al. |
| 9,449,214 B2 | 9/2016 | Lundahl |
| 2008/0165158 A1 | 7/2008 | Hotelling et al. |
| 2013/0108124 A1 | 5/2013 | Wickboldt et al. |
| 2016/0004899 A1* | 1/2016 | Pi .................. G06F 1/1626 345/173 |
| 2016/0131505 A1 | 5/2016 | Rao et al. |
| 2016/0314334 A1* | 10/2016 | He ...................... G06K 9/0012 |
| 2016/0321442 A1* | 11/2016 | Song ................... G06F 3/0488 |
| 2016/0357294 A1* | 12/2016 | Ozeki ..................... C03C 15/00 |
| 2017/0147852 A1 | 5/2017 | Benkley, III et al. |
| 2017/0357842 A1* | 12/2017 | Park ..................... G06K 9/0002 |
| 2017/0372123 A1* | 12/2017 | Kim ..................... G06F 3/0412 |
| 2018/0300523 A1* | 10/2018 | Fang ................... G02B 6/0083 |

FOREIGN PATENT DOCUMENTS

| | | |
|---|---|---|
| WO | WO 2016060201 A1 | 4/2016 |
| WO | WO 2016060202 A1 | 4/2016 |

OTHER PUBLICATIONS

"3M Wind Acrylic Structural Adhesive W1210", 3M Corporation, May 2012, pp. 1-2. (Year: 2012).*

(Continued)

*Primary Examiner* — Brian Werner
(74) *Attorney, Agent, or Firm* — Rothwell, Figg, Ernst & Manbeck, P.C.

(57) ABSTRACT

A fingerprint sensor assembly includes a capacitive fingerprint sensor disposed beneath a thin layer of glass and a reinforcement layer of a material of relatively high dielectric constant bonded to the glass between the glass layer and the sensor.

21 Claims, 2 Drawing Sheets

(56) References Cited

OTHER PUBLICATIONS

Aurn K. Varshneya et al., "Cover screens for personal electronic devices: Strengthened glass or sapphire?", www.ceramics.org, American Ceramics Society Bulletin, vol. 96, No. 5, Jul. 2017, cover sheet showing date, and pp. 20-25. (Year: 2017).*
S.A. Campbell et al., "Titanium dioxide (TiO2)-based gate insulators", IBM J. Res. Develop. vol. 43 No. 3 May 1999, pp. 383-392. (Year: 1999).*
"Titanium Dioxide—Titania (Ti02)", https://www.azom.com/properties.aspx?ArticleID=1179, downloaded on Sep. 13, 2018, 4 pages total. (Year: 2018).*
"Technical Data: Zirconia (Zirconium Oxide, Zro2)", https://global.kyocera.com/prdct/fc/list/material/zirconia/zirconia.html, Kyocera, pp. 1-4, downloaded on Sep. 13, 2018. (Year: 2018).*
Crystal Systems, "Sapphire: Physical and Mechanical Properties", from Crystal Systems, copyright 2002, 1 page, downloaded from https://www.cmscientific.com/info_sheets/Sapphire_Physical_Mechanical_Properties.pdf. (Year: 2002).*

* cited by examiner

REINFORCEMENT PANEL FOR FINGERPRINT SENSOR COVER

CROSS REFERENCE OF RELATED APPLICATION

This application claims the benefit under 35 U.S.C. § 119(e) of the filing date of provisional patent application Ser. No. 62/354,210 filed Jun. 24, 2016, the disclosure of which is incorporated herein by reference.

FIELD OF THE DISCLOSURE

This disclosure relates to finger print sensors installed within a glass panel user interface of a smart phone or similar device.

BACKGROUND

The incorporation of electronic fingerprint sensors into smart phones, handheld computers, and other similar devices for securing and controlling access to the device has become prevalent. Electronic fingerprint sensors, such as capacitive fingerprint sensors, function by detecting minute changes in an electrical property within different portions of the sensor on a spatial scale corresponding to the grooves and ridges of a fingerprint pattern.

It is desirable for aesthetic and functional reasons to integrate fingerprint sensors into the display glass of mobile smart phones or other similar devices. However, actual integration of the sensor electronics, e.g., linear conductors and the like, into the display glass involves challenges both technically and in terms of manufacturing infrastructure. To do so with a substrate-based sensor (i.e., a capacitive sensor with drive conductors and sense or pickup conductors separated from the drive conductors by a dielectric substrate), for example, would require through glass vias to interconnect from top to bottom of the glass, and redistribution circuit layers on both sides of the display glass to integrate the sensor technology.

Likewise, putting sensors, such as on-chip or off-chip capacitive sensors, behind the display glass would cause a significant and typically unacceptable degradation of the signal to noise ratio (SNR) for the sensor, and likewise causes increased blurring of the imaged (sensed) fingerprint—particularly because display glass must be thick enough to maintain its mechanical integrity through normal handling of the device. Typical strengthened glasses used in smartphones have relatively low dielectric constant (D k) values, e.g., in the range of 3.5 to 10, and signal-to-noise ratio ("SNR") degradation for a given thickness of material over a capacitive sensor is greater as the dielectric constant of the material is reduced. Thus, development of high SNR in "behind-glass" fingerprint sensors for smartphones requires the use of ultra-thin glass cover material with as small a thickness as possible or a localized region of thinned glass in the area where the sensor is located.

Unfortunately, the use of ultra-thin glass covers on mobile devices to maintain allow low thickness over finger print sensors results in a reduction in mechanical robustness of the glass upon impact, as well as undesirable increases in flexing of the glass under loads, which can cause pre-existing defects in the glass to propagate as cracks. These phenomena adversely affect reliability of the fingerprint sensor.

Existing solutions to this problem are to use a thicker glass cover over the fingerprint sensor and accept the resulting reduced SNR for the sensor with associated reduction in performance, increase in false accept rate/false reject rate (FAR/FRR), and reliability.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

Aspects of this disclosure include the use of high-Dk (e.g., Dk greater than 10 and more typically in the range of 15 to 40 or more) ceramics and polymer-ceramic composites as integral parts of a capacitive fingerprint sensor assembly integrated into a mobile device cover glass, which may also function as a display and touch screen.

The assembly disclosed herein improves the mechanical robustness, function, and reliability of "behind glass" capacitive sensors, or sensors with ultra-thin glass covers, while minimizing the degradation of the capacitive sensor performance (e.g., SNR) and hence minimizing the negative effect on the overall electrical function of the sensor. This is achieved by the incorporation of high Dk ceramic materials, such as monolithic ceramic inserts (i.e., a one piece, homogenous ceramic material, rather than a layered material or a composite material (such as a polymer with high Dk ceramic filler)), high Dk ceramic-containing composite inserts, or high Dk ceramic-containing fill materials, into the region between the sensor and the underside of the covering glass.

In one embodiment, a structure is disclosed that provides a robust integration of a fingerprint sensor (e.g., a capacitive fingerprint sensor) into the cover glass/display/touch screen of a mobile electronic device. In one embodiment, the fingerprint sensor (FPS) is integrated into a blind or through opening formed in the cover glass. In an embodiment, a very thin glass cover is placed over the FPS for ideal aesthetics and industrial design of the finished cover glass. The glass cover may be strengthened, such as by heat strengthening (tempering) or by a chemical strengthening (ion exchange) process, similar to Gorilla® Glass by Corning®. The glass cover may have a thickness in the range of 50 to 200 microns, and preferably in the range of 70 to 120 μm. The cover is intimately bonded to a like-sized ceramic or ceramic-composite supporting or reinforcement panel. The ceramic reinforcement panel may be comprised of a very high dielectric material, and also is highly rigid (e.g., flexural strength 400 to 1500 MPa or higher) and has a high fracture toughness (e.g., 3.5 to 15 MPam$^{1/2}$). Exemplary materials include zirconia (typically Dk=25 to 40) or barium titanate, barium strontium titanate, etc. (typically Dk of up to 2000). The ceramic support is placed between the thin, strengthened glass cover and the FPS to improve robustness of the glass cover while minimizing the degradation of sensor performance that can accompany a thickened cover. Ideally, the coefficient of thermal expansion (CTE) of the ceramic support is matched to the thin, glass cover. For example, strengthened glass, such as Gorilla® Glass, typically has a CTE of 8.4 ppm/C. Zirconia typically has a CTE of 10.3 ppm/C, which provides a closely matched CTE to minimize interfacial stress between the ceramic and the glass. The ceramic support is engineered in terms of thickness, dielectric properties, and mechanical properties to optimize the robustness of the glass cover and the electrical performance of the sensor.

In another embodiment, the cover glass/display/touch screen of a mobile electronic device has a thinned region at which the glass thickness is substantially reduced in a localized area where a sensor will be located. The intent of the thinned region is to reduce the degradation of the sensor function that occurs due to the thickness and low dielectric constant of the cover glass. A ceramic or ceramic-composite reinforcement panel is intimately bonded to or molded into the thinned region of the cover glass between the cover glass and the FPS. The ceramic support is comprised of a very high dielectric material, and also is highly rigid and has a high fracture toughness and is preferably closely matched in CTE to the cover glass. The ceramic reinforcement is placed between the thinned cover glass and the FPS to improve mechanical robustness of the thinned cover glass while minimizing the degradation of sensor performance.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various embodiments of the subject matter of this disclosure. In the drawings, like reference numbers indicate identical or functionally similar elements.

DETAILED DESCRIPTION

Figure 1:
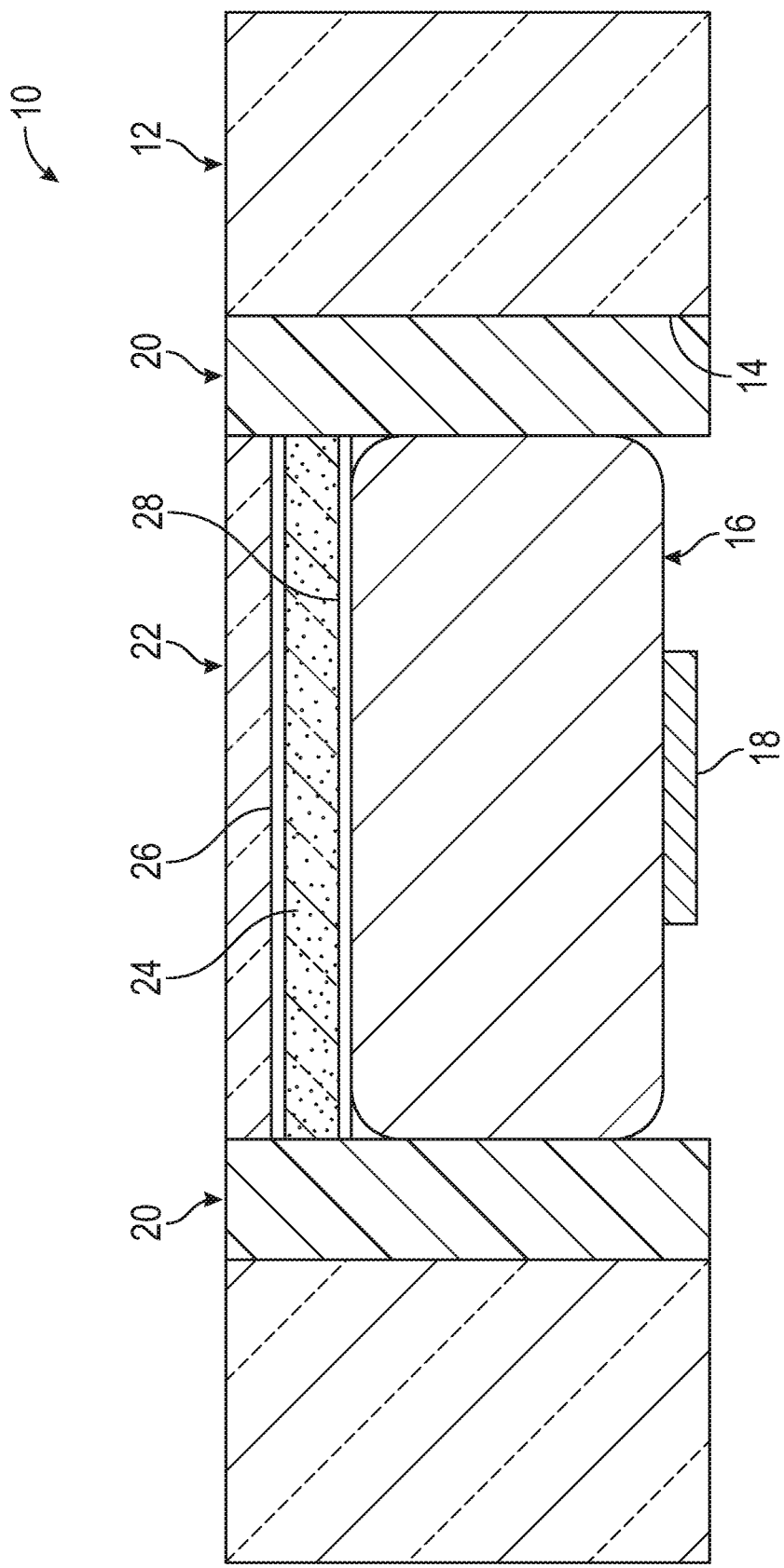
FIG. 1 is a transverse cross-section of a fingerprint sensor installation employing a cover and a reinforcement or supporting panel as disclosed herein.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an exemplary implementation of a device embodying aspects of the disclosure and are not intended to be limiting.

The use of the term "about" applies to all numeric values specified herein, whether or not explicitly indicated. This term generally refers to a range of numbers that one of ordinary skill in the art would consider as a reasonable amount of deviation to the recited numeric values (i.e., having the equivalent function or result) in the context of the present disclosure. For example, and not intended to be limiting, this term can be construed as including a deviation of ±10 percent of the given numeric value provided such a deviation does not alter the end function or result of the value. Therefore, under some circumstances as would be appreciated by one of ordinary skill in the art a value of about 1% can be construed to be a range from 0.9% to 1.1%.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the embodiments described herein.

As used herein, the terms "optional" and "optionally" mean that the subsequently described, component, structure, element, event, circumstance, characteristic, property, etc. may or may not be included or occur and that the description includes instances where the component, structure, element, event, circumstance, characteristic, property, etc. is included or occurs and instances in which it is not or does not.

As used herein, the term "fingerprint" means a map of contrasting amplitude elements from a pattern source. As such, a ridge/furrow pattern on a human finger is included as a fingerprint. Additionally, zebra stripe patterns, retinal vein patterns, or other collections of contrasting amplitude elements having a set of a plurality of sufficiently long succession of similarly contrasted elements.

Embodiments described herein alleviate the problem of reduced mechanical reliability resulting from the use of ultra-thin glass (e.g., less than 500 μm thickness) for "under-glass" or "through-glass" capacitive fingerprint sensors incorporated into smartphones or other devices with a glass user interface. The electric field equivalent vacuum dielectric thickness $T_v$ is a convenient measure of the combined effect on the electric field of a dielectric layer of thickness t and dielectric constant Dk and is given by the formula:

$$T_v = \frac{t}{D_k}$$

For a given dielectric layer thickness t, as Dk increases, $T_v$ decreases. Ultra-thin glass over sensing elements of a capacitive FPS is used because, for capacitive-type fingerprint sensors, small electric field equivalent vacuum thicknesses ($T_v$) are required between the sensor circuitry and the surface of the finger print of the user. For example, for glass with Dk=7, a thickness of t=500 μm would result in $T_v$=500 μm/7=71 μm. Such a large equivalent vacuum thickness would make it impossible to obtain a satisfactory SNR value, or, in fact, any image of value, for a capacitive sensor. In order to achieve an acceptable SNR value for the sensor, the glass thickness may typically have to be reduced to 100 μm, and perhaps to as little as 70 μm. In the case of 100 μm glass, $T_v$=100 μm/7=14 μm. In the case of 70 μm glass, $T_v$=70 μm/7=10 μm.

However, as the thickness of the glass is reduced to maintain an acceptable imaging capability and SNR value, the mechanical robustness and reliability of the covering glass is also reduced. For example, the glass resistance to impact or to a high localized load is reduced, and the probability of fracture of the covering glass is increased.

Consumer electronic products such as smartphones have to be able to withstand daily impacts from handling or mishandling. Evaluation of mechanical robustness for consumer portable electronic products may include indentation testing (or puncture testing), ball drop testing, tumble testing, and device drop testing. Ball drop testing involves dropping a metal ball from different heights onto the surface of the glass cover over the fingerprint sensor. The severity of the drop test is determined by the ball diameter, ball mass, and drop height. Depending on the severity of the drop test, the glass cover may be damaged by flexing, leading to cracking, or by crushing, depending on test conditions, glass thickness, and the nature of the layer stack up below the glass. This stack up may include metallic and non-metallic layers, including some layers with low elastic modulus, such as, low-modulus adhesives and other polymers. If the glass cover is thin, and there is insufficient support provided by the stack up layers, the glass cover may tend to flex excessively during indentation or ball impact leading to failure of the glass.

Embodiments described herein mitigate these problems by incorporating rigid, high Dk (e.g., at least 20 and ranging possibly up to several thousand) reinforcement material between the sensor assembly stack up and the ultra-thin glass cover, or between the sensor and a localized, thinned region of the cover glass designed to house the sensor. To provide sufficient mechanical support, this material has to be sufficiently thick. If the supporting material had a low Dk value, this would degrade the SNR of the sensor, similarly to thickened glass, and render the sensor unusable.

An exemplary assembly embodying concepts disclosed herein is shown in FIG. 1. The assembly 10 comprises a cover glass 12 of a user interface screen of a smart phone or similar device having an opening 14 formed therein for receiving a fingerprint sensor or sensor sub-assembly 16. In an embodiment, fingerprint sensor 16 may comprise an assembly including a rigid glass substrate around which is wrapped a flexible dielectric having formed thereon conductive lines that, when folded over the rigid substrate, cooperate to form a sensor matrix. A circuit element 18, such as an ASIC, may be attached to the flexible substrate and connected to the conductive element. Exemplary embodiments of fingerprint sensors of this type are described in commonly-owned U.S. Patent Application Publication No. US 2017/0147852, the disclosure of which is hereby incorporated by reference. Opening 14 may be formed completely through the cover glass 12 or may form a blind hole not extending completely through the cover glass and within which the fingerprint sensor 16 is placed. The fingerprint sensor 16 maybe mounted within the opening 14 in a spacer element 20 partially or completely surrounding the fingerprint sensor 16, and the spacer and sensor may be secured within the opening 14 by a suitable adhesive as described in U.S. Patent Application Publication No. US 2017/0147852.

The opening 14 and the fingerprint sensor 16 are covered by a glass cover (or cover layer) 22. Glass cover 22 is a discrete panel of glass that is separate from the cover glass 12 and may be disposed within the spacer element 20, as shown in FIG. 1, or may rest above the spacer element 20. The assembly may be configured so that the glass cover 22 is flush with, recessed below, or projected above the top surface of the cover glass 12. A high strength, hi Dk reinforcement panel 24 is disposed between the fingerprint sensor 16 and the glass cover 22 and is intimately bonded to the glass cover 22 by an adhesive layer 26. In addition, the reinforcement panel 24 may be secured to the fingerprint sensor 16 by an adhesive layer 28. In various embodiments, the reinforcement panel is at least the same size as the glass cover, so that the glass cover is fully supported by the panel—i.e. no unsupported glass overhang with respect to the reinforcement panel. With alignment tolerances, that may mean in some embodiments that the reinforcement panel would need to be slightly larger than the glass cover. In other embodiments, reinforcement material and glass would be bonded together first, and then the shape of the cover is cut out from the bonded materials, e.g., by laser, so that the alignment tolerance between glass cover and panel is essentially zero (i.e., no misalignment).

Figure 2:
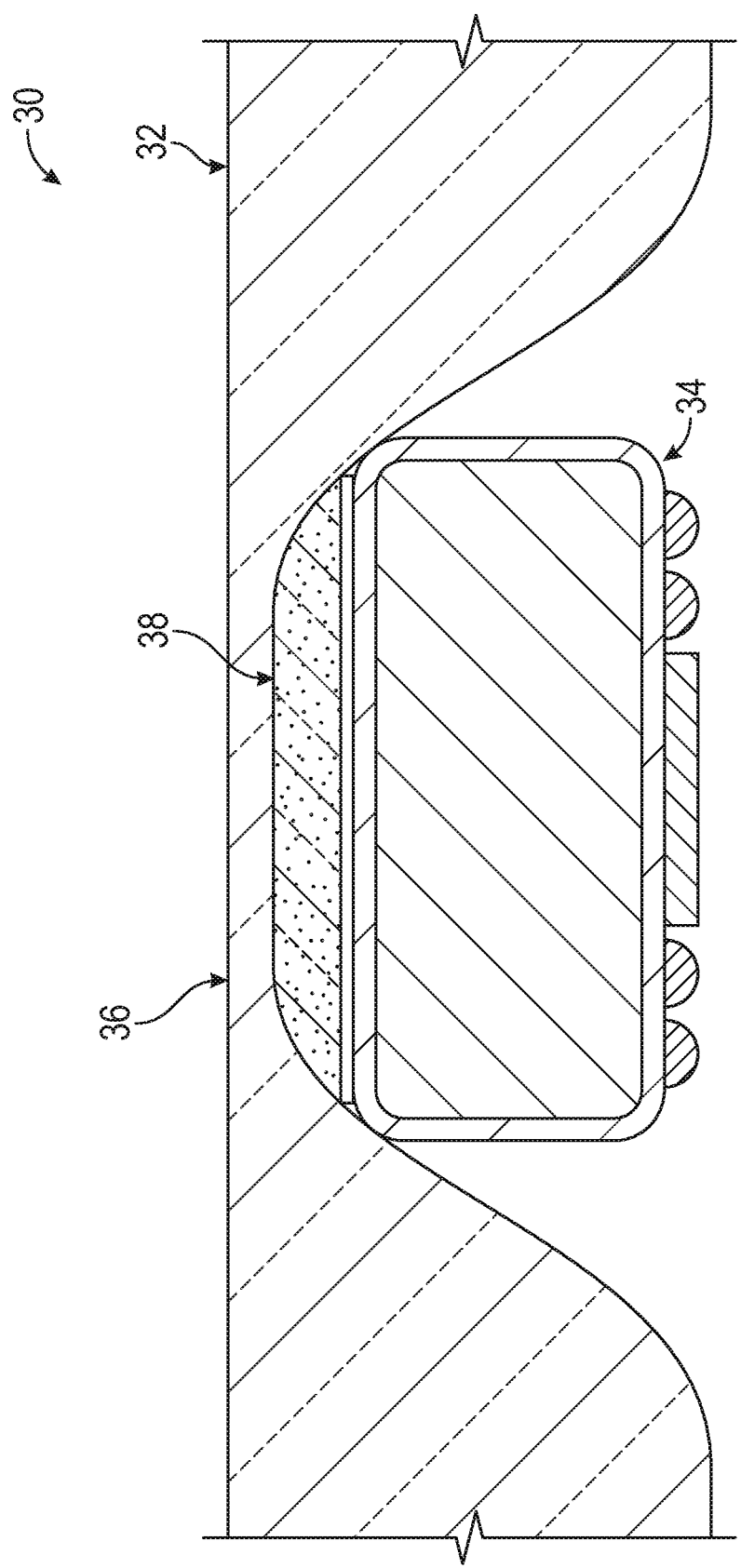
FIG. 2 is a transverse cross-section of a fingerprint sensor installation beneath a thinned region of a smart phone cover glass and employing reinforcement or supporting material bonded to or molded into the thinned region above the fingerprint sensor.

An alternate assembly 30 embodying concepts disclosed herein is shown in FIG. 2. The assembly 30 comprises a cover glass 32 of a user interface screen of a smart phone or the like with a sensor body 34 disposed beneath the cover glass 32 at a region 36 at which the cover glass is thinned out to accommodate a fingerprint sensor or sensor subassembly 34 and form a cover layer over the sensor or sensor assembly, as described above. A reinforcement material 38 is bonded to or molded into the thinned section 36 of cover glass 32 above the sensor body 34.

The cover glass 32 may comprise an integrated touch panel and display, and may be generally of a thickness which provides a sufficient robustness to meet consumer expectations for product life and reliability under normal use conditions. In the case of commercially-available ion-exchange-strengthened glass materials, the thickness may be in the range of 0.3 to 0.7 mm glass, and Corning® Gorilla® Glass, for example, is available in thicknesses of 0.4 mm to 1 mm or 2 mm. In this embodiment, the glass is thinned locally in a region 36 where the fingerprint sensor 34 (e.g., a capacitive fingerprint sensor) is to be located. The cover glass may be thinned in region 36 by machining or by selective chemical etching. This locally thinned region has a reduced mechanical strength, but the reduced thickness of the relatively low Dk glass reduces the degradation of sensor SNR relative to the degradation which would occur if the sensor were placed behind the full thickness cover glass. In the locally thinned area, a very high dielectric constant and high rigidity material 38, such as a high Dk ceramic or a ceramic-polymer composite, fills the locally thinned area or a portion there of, providing a mechanical reinforcement to the thin glass while minimizing degradation of the sensor performance by minimizing reduction in the SNR. In various embodiments, the mechanical reinforcement is bonded to the glass cover to ensure that intimate contact between the reinforcement and the glass is maintained. If the reinforcement material is a flowable material that is poured or injected into the thinned region 36, it may naturally form a bond to the glass during curing or solidification, and the glass surface facing the composite may be treated to enhance bonding (e.g., plasma treatment for cleaning and/or roughening, mechanical or chemical treatment for cleaning/roughening, coupling agents such as silanes, etc.). If the reinforcement material is in the form of a pre-made panel that fits into the thinned region 36, it may be secured to the glass with an adhesive, particularly a flowable adhesive that will ensure no air gaps between the glass and the reinforcement panel.

The reinforcement or supporting material 24, 38 employed in assemblies 10, 30, respectively, which may be an insert or a filler, is made of a high stiffness (e.g., flexural strength 400 to 1500 MPa or higher), ultra-high Dk value material. In one embodiment, the supporting material is comprised wholly or in part of one or more ultra-high Dk ceramics including, but not limited, to titanium dioxide ($TiO_2$), barium titanate, barium strontium titanate ("BST"), zirconia, ceramic blends of these materials, composite ceramic-polymer material options, or other examples. The thickness of the supporting material is determined in part by the calculated $T_v$ value. For example, a 100 µm thick material with Dk=100, would have an effective Tv=100 µm/100=1 µm which would contribute an insignificant amount to the overall equivalent vacuum dielectric thickness. In some embodiments, the thickness of the reinforcement layer is 10% to 200% of the thickness of the cover. High-Dk monolithic ceramic metal oxides such as titania ($TiO_2$) (naturally occurring oxide of titanium and variously referred to as titanium dioxide, titanium oxide and titania), barium titanate ($BaTiO_3$), and barium strontium titanate, as well as polymer+ceramic composite and nano-composite high-Dk materials, for example barium titanate+epoxy based systems are contemplated as exemplary, suitable materials.

In one embodiment, an ultra-high Dk ceramic insert is adhesively bonded to the back of a glass cover before attaching the glass cover over a sensor sub-assembly disposed in a cutout formed in a cover glass. The ultra-high Dk insert may, for example, be bonded using either a dispensed, sprayed or printed adhesive, a film adhesive such as a B-staged epoxy, bond ply adhesive, or modified acrylic adhesive, or may be attached using a pressure-sensitive adhesive (either supported or free-standing and available in sheet form, screen printed, or applied via mask deposition potentially less than 10 µm thick and UV curable), or by other means of bonding glass to ceramic. Exemplary suitable adhesives include acrylic-based thermoset adhesives, such as DuPont Pyralux LF or Pyralux FR sheet adhesive or bond ply adhesive. The adhesive may comprise high modulus of elasticity/highly cross-linked, epoxy-type thermoset adhesives and/or adhesive with particle fillers, nano-fillers, or other fillers to further increase the modulus of elasticity of the adhesive. In various embodiments, such adhesive fillers can also be used to tailor other properties of the adhesives, such as rigid filler materials with high dielectric constants to reduce negative impact of the adhesive thickness on the signal to noise ratio In another embodiment, a cured composite material comprising a highly cross-linkable polymer, such as a high strength epoxy, and an ultra-high Dk ceramic composite material (e.g. a nanocomposite polymer composite dielectric) is adhesively bonded to the back of a glass cover before attaching the glass cover to the sensor sub-assembly.

All of the above embodiments may be applied to the configuration in which a region at the back of a cover glass is thinned for example using laser ablation, acid etching, mechanical machining, or another method to leave a thin-glass area below which the sensor is mounted. The embodiments may equally be applied to the configuration in which a section of the smartphone cover glass is cut through and removed, and a sensor assembly with thin glass cover is inserted into the hole (possibly sealed using a peripheral gasket or an adhesive, or by molding it in place into the cover glass).

EXEMPLARY EMBODIMENTS

Embodiment 1 A fingerprint sensor assembly comprising: a capacitive fingerprint sensor; a cover layer disposed above the fingerprint sensor, the cover layer having a dielectric constant of less than 10 and a thickness of less than 300 µm; and a reinforcement layer between the fingerprint sensor and the cover layer and bonded or molded to the cover layer, the reinforcement layer comprising a material having a dielectric constant of at least 20 and having a thickness of 10% to 200% of the thickness of the cover layer.

Embodiment 2 The fingerprint sensor assembly of Embodiment 1, wherein the reinforcement layer comprises a material selected from the group consisting of: titanium dioxide ($TiO_2$), barium strontium titanate, zirconia, and barium titanate+epoxy based systems.

Embodiment 3 The fingerprint sensor assembly of Embodiment 1 or Embodiment 2, wherein the reinforcement layer comprises a reinforcement panel bonded to the cover layer by an adhesive, and wherein the adhesive comprises one or more materials selected from the group consisting of: pressure sensitive adhesive, B-staged sheet adhesive, bond ply adhesive, acrylic-based thermoset adhesives, high modulus of elasticity/highly cross-linked, epoxy-type thermoset adhesives, adhesive with particle fillers to increase the modulus of elasticity of the adhesive, and adhesives with filler materials having high dielectric constants.

Embodiment 4 The fingerprint sensor assembly of any one of Embodiments 1 to 3, wherein the reinforcement layer is bonded to the fingerprint sensor, and wherein the adhesive comprises one or more materials selected from the group consisting of: pressure sensitive adhesive, B-staged sheet adhesive, bond ply adhesive, acrylic-based thermoset adhesives, high modulus of elasticity/highly cross-linked, epoxy-type thermoset adhesives, adhesive with particle fillers to increase the modulus of elasticity of the adhesive, and adhesives with filler materials having high dielectric constants.

Embodiment 5 The fingerprint sensor assembly of any one of Embodiments 1 to 4, wherein the cover layer comprises a glass cover.

Embodiment 6 The fingerprint sensor assembly of any one of Embodiments 1 to 4, wherein the cover layer comprises a thinned region of a cover glass screen of a mobile electronic device.

Embodiment 7 The fingerprint sensor assembly of any one of Embodiments 1 to 6, wherein the cover layer thickness is less than or equal to 200 μm and the reinforcement layer thickness is at least 50 μm.

Embodiment 8 The fingerprint sensor assembly of any one of Embodiments 1 to 7, wherein the reinforcement layer comprises a material having flexural strength of at least 400 to 1500 Mpa.

Embodiment 9 The fingerprint sensor assembly of Embodiment 8, wherein the reinforcement layer comprises a material having flexural strength greater than 1500 Mpa.

Embodiment 10 The fingerprint sensor assembly of any one of Embodiments 1 to 9, wherein the reinforcement layer comprises a material having a fracture toughness of 3.5 to 15 Mpam$^{1/2}$.

Embodiment 11 The fingerprint sensor assembly of any one of Embodiments 1 to 10, wherein the reinforcement layer and the cover layer comprise materials having substantially the same coefficient of thermal expansion.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A fingerprint sensor assembly for incorporation in a through opening in a cover glass comprising:
   a capacitive fingerprint sensor;
   a cover layer disposed above the fingerprint sensor, wherein the cover layer is a discrete panel that is separate from the cover glass; and
   a reinforcement layer between the fingerprint sensor and the cover layer and bonded or molded to the cover layer.

2. The fingerprint sensor assembly of claim 1, wherein the reinforcement layer comprises a material selected from the group consisting of: titanium dioxide (TiO$_2$), barium strontium titanate, zirconia, and barium titanate+epoxy based systems.

3. The fingerprint sensor assembly of claim 1, wherein the reinforcement layer comprises a reinforcement panel bonded to the cover layer by an adhesive, and wherein the adhesive comprises one or more materials selected from the group consisting of: pressure sensitive adhesive, B-staged sheet adhesive, bond ply adhesive, acrylic-based thermoset adhesives, high modulus of elasticity/highly cross-linked, epoxy-type thermoset adhesives, adhesive with particle fillers to increase the modulus of elasticity of the adhesive, and adhesives with filler materials having high dielectric constants.

4. The fingerprint sensor assembly of claim 1, wherein the reinforcement layer is bonded to the fingerprint sensor, and wherein the adhesive comprises one or more materials selected from the group consisting of: pressure sensitive adhesive, B-staged sheet adhesive, bond ply adhesive, acrylic-based thermoset adhesives, high modulus of elasticity/highly cross-linked, epoxy-type thermoset adhesives, adhesive with particle fillers to increase the modulus of elasticity of the adhesive, and adhesives with filler materials having high dielectric constants.

5. The fingerprint sensor assembly of claim 1, wherein the cover layer comprises a glass cover.

6. The fingerprint sensor assembly of claim 1, wherein the cover layer thickness is in the range of 50 to 200 μm and the reinforcement layer thickness is at least 50 μm.

7. The fingerprint sensor assembly of claim 1, wherein the reinforcement layer comprises a material having flexural strength of at least 400 to 1500 Mpa.

8. The fingerprint sensor assembly of claim 7, wherein the reinforcement layer comprises a material having flexural strength greater than 1500 Mpa.

9. The fingerprint sensor assembly of claim 1, wherein the reinforcement layer comprises a material having a fracture toughness of 3.5 to 15 MPam$^{1/2}$.

10. The fingerprint sensor assembly of claim 1, wherein the reinforcement layer and the cover layer comprise materials having substantially the same coefficient of thermal expansion.

11. The fingerprint sensor assembly of claim 3, wherein the reinforcement layer is bonded to the fingerprint sensor, and wherein the adhesive comprises one or more materials selected from the group consisting of: pressure sensitive adhesive, B-staged sheet adhesive, bond ply adhesive, acrylic-based thermoset adhesives, high modulus of elasticity/highly cross-linked, epoxy-type thermoset adhesives, adhesive with particle fillers to increase the modulus of elasticity of the adhesive, and adhesives with filler materials having high dielectric constants.

12. The fingerprint sensor assembly of claim 11, wherein the cover layer comprises a glass cover.

13. The fingerprint sensor assembly of claim 2, wherein the cover layer thickness is in the range of 50 to 200 μm and the reinforcement layer thickness is at least 50 μm.

14. The fingerprint sensor assembly of claim 6, wherein the reinforcement layer comprises a material having flexural strength of at least 400 to 1500 Mpa.

15. The fingerprint sensor assembly of claim 7, wherein the reinforcement layer comprises a material having a fracture toughness of 3.5 to 15 MPam$^{1/2}$.

16. The fingerprint sensor assembly of claim 5, wherein the reinforcement layer and the cover layer comprise materials having substantially the same coefficient of thermal expansion.

17. The fingerprint sensor assembly of claim 2, wherein the reinforcement layer comprises a reinforcement panel bonded to the cover layer by an adhesive, and wherein the adhesive comprises one or more materials selected from the group consisting of: pressure sensitive adhesive, B-staged sheet adhesive, bond ply adhesive, acrylic-based thermoset adhesives, high modulus of elasticity/highly cross-linked, epoxy-type thermoset adhesives, adhesive with particle fillers to increase the modulus of elasticity of the adhesive, and adhesives with filler materials having high dielectric constants.

18. The fingerprint sensor assembly of claim 17, wherein the reinforcement layer is bonded to the fingerprint sensor, and wherein the adhesive comprises one or more materials selected from the group consisting of: pressure sensitive adhesive, B-staged sheet adhesive, bond ply adhesive, acrylic-based thermoset adhesives, high modulus of elasticity/highly cross-linked, epoxy-type thermoset adhesives, adhesive with particle fillers to increase the modulus of elasticity of the adhesive, and adhesives with filler materials having high dielectric constants.

19. The fingerprint sensor assembly of claim 5, wherein the cover layer thickness is in the range of 50 to 200 μm and the reinforcement layer thickness is at least 50 μm.

20. The fingerprint sensor assembly of claim 1, wherein the cover layer comprises a material having a dielectric constant of less than 10 and a thickness in the range of 50 to 300 μm.

21. The fingerprint sensor assembly of claim 1, wherein the reinforcement layer comprises a material having a dielectric constant of at least 20 and having a thickness of 10% to 200% of the thickness of the cover layer.

* * * * *